May 7, 1968 M. CAMRAS 3,382,326

MAGNETIC TRANSDUCER HEAD

Filed March 8, 1962 6 Sheets-Sheet 1

INVENTOR.
MARVIN CAMRAS
BY
Hill, Sherman, Meroni, Gross & Simpson
ATTORNEYS

INVENTOR.
MARVIN CAMRAS
BY
Hill, Sherman, Meroni, Gross & Simpson
ATTORNEYS

INVENTOR.
MARVIN CAMRAS
BY
Hill, Sherman, Meroni, Gross & Simpson
ATTORNEYS

May 7, 1968 M. CAMRAS 3,382,326

MAGNETIC TRANSDUCER HEAD

Filed March 8, 1962 6 Sheets-Sheet 4

INVENTOR.
MARVIN CAMRAS
BY
Hill, Sherman, Meroni, Gross & Simpson
ATTORNEYS

*INVENTOR.*
MARVIN CAMRAS
*BY*
Hill, Sherman, Meroni, Gross & Simpson
ATTORNEYS

May 7, 1968 M. CAMRAS 3,382,326

MAGNETIC TRANSDUCER HEAD

Filed March 8, 1962 6 Sheets-Sheet 6

INVENTOR.
MARVIN CAMRAS

BY

Hill, Sherman, Meroni, Gross & Simpson
ATTORNEYS

United States Patent Office 3,382,326
Patented May 7, 1968

3,382,326
MAGNETIC TRANSDUCER HEAD

Marvin Camras, Glencoe, Ill., assignor to IIT Research Institute, a corporation of Illinois Continuation-in-part of applications Ser. No. 835,017, Aug. 20, 1959, and Ser. No. 47,741, Aug. 5, 1960. This application Mar. 8, 1962, Ser. No. 178,293
26 Claims. (Cl. 179—100.2)

This invention relates to a magnetic transducer device and particularly to a magnetic transducer head for recording and/or reproducing signals on magnetic record media.

The present application is a continuation-in-part of my copending applications Ser. No. 835,017 filed Aug. 20, 1959 and Ser. No. 47,741 filed Aug. 5, 1960, now abandoned, and the disclosures of these two applications are incorporated herein by reference.

It is a particular object of the present invention to provide a playback head of increased sensitivity for reproducing signals recorded on narrow channels of a magnetic record medium.

A further object of the invention is to provide a novel and improved magnetic transducer head for recording and/or reproducing video signals and the like having a relatively high line scanning rate such as 15,750 lines per second.

Another object of the invention is to provide a magnetic playback head for reproducing transversely distributed signals on a magnetic record medium with a greatly increased signal-to-noise ratio.

A still further object of the present invention is to provide a magnetic transducer device having a series of core units which are sequentially switched from one polarity of magnetization to an opposite polarity of magnetization while producing a minimum output in the absence of a signal flux to be transduced.

Still another object of the invention is to provide a magnetic transducer device having a series of core units for sequential activation and means for effectively reducing coupling between adjacent core units.

A yet further object of the present invention is to provide a video recording head utilizing a common signal source on the opposite side of the record medium from the channel switching portion of the head.

It is another object of the invention to provide a magnetic transducer head of simplified construction.

A further object of the invention is to provide a novel and improved combined recording and playback head for video signals and the like.

It is also an object of this invention to provide a core switching system wherein the core units may be divided into groups having common windings and which groups are sequentially activated in successive portions of each cycle.

An additional object is to provide a core switching system having a graded winding and wherein the net MMF's acting in the successive cores are more nearly equal in magnitude and/or have more nearly equal phase differences than the comparable systems disclosed in my aforementioned applications.

A further object is to provide novel means for adapting a playback head in accordance with this invention for optimum recording operation.

Other objects, features and advantages of the present invention will be apparent from the following detailed description taken in connection with the accompanying drawings, in which.

Figure 1:
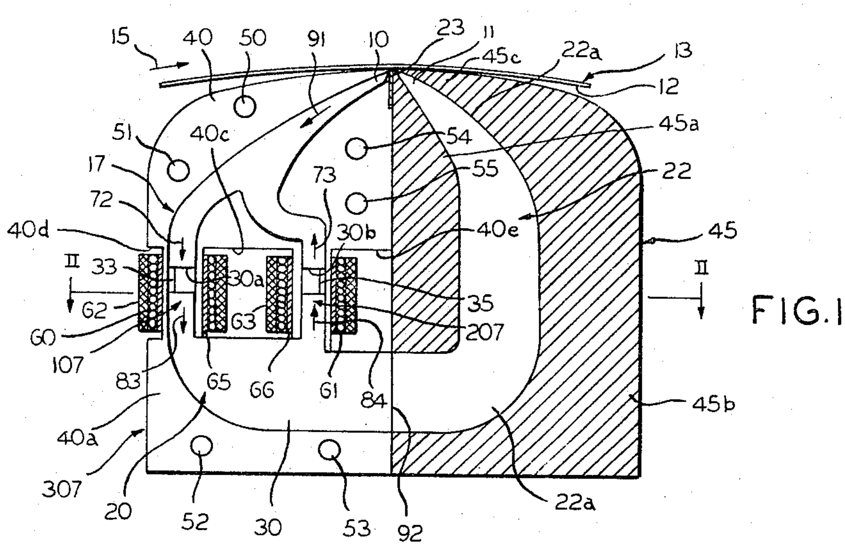
FIGURE 1 is a vertical sectional view of a magnetic transducer head in accordance with the present invention.
Figure 2:
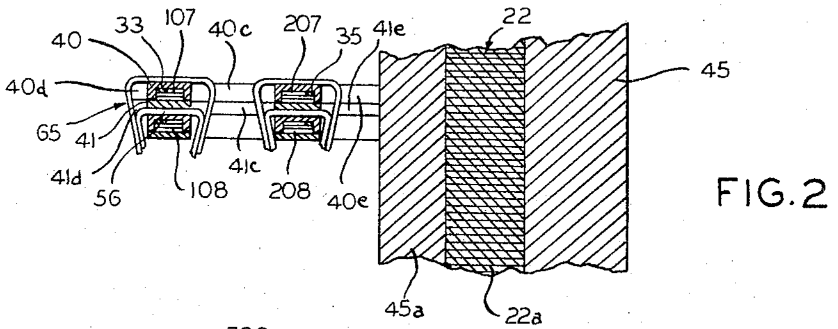
FIGURE 2 is a fragmentary horizontal sectional view of the head of FIGURE 1 taken generally along the line II—II in FIGURE 1.
Figure 4:
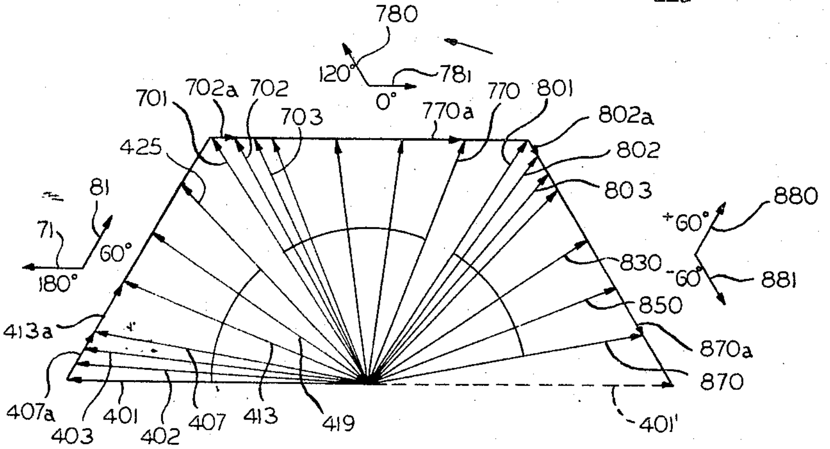
Figure 2A:
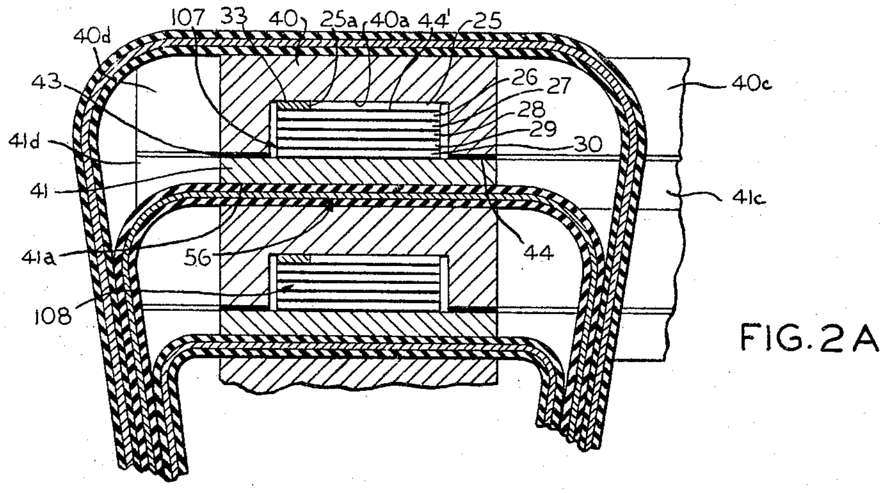
Figures 17, 18, 19:
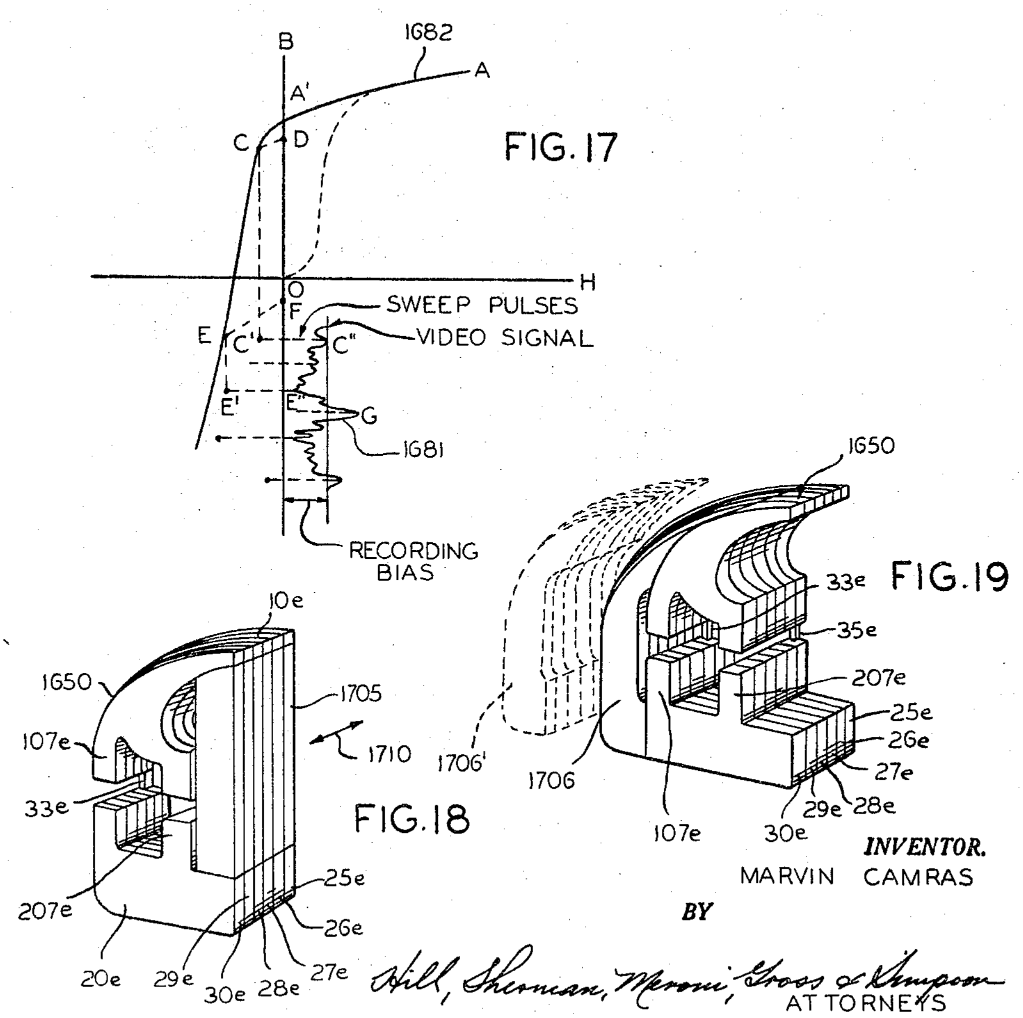
Figure 3:
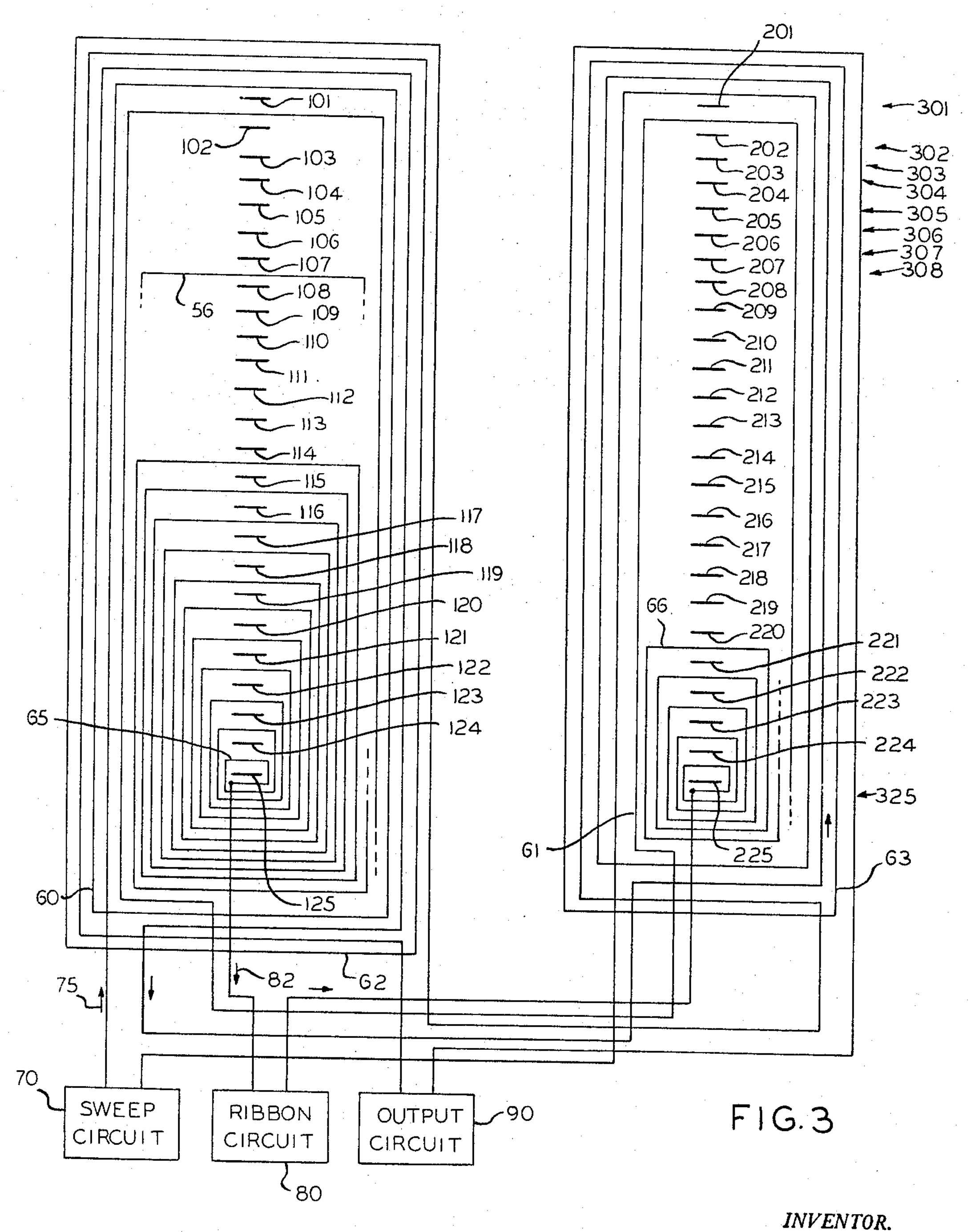
Figures 5A, 5B, 5C:
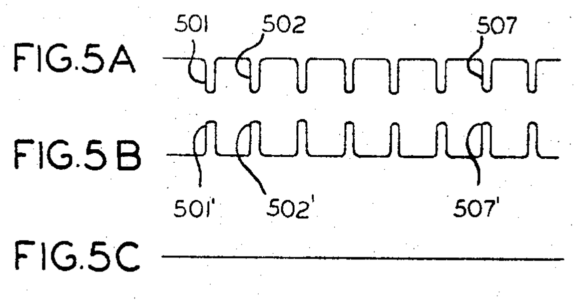
Figure 9:
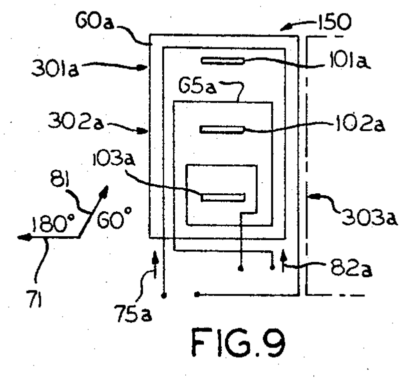
Figures 6A, 6B, 6C:
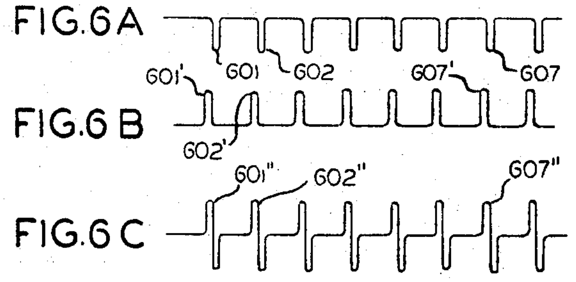
Figure 10:
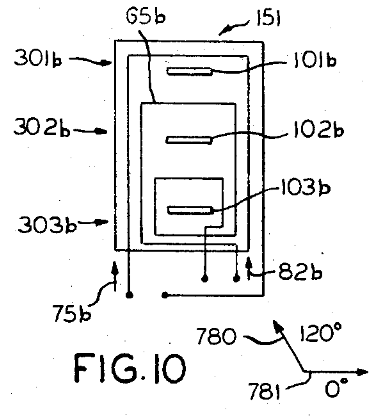
Figure 7:
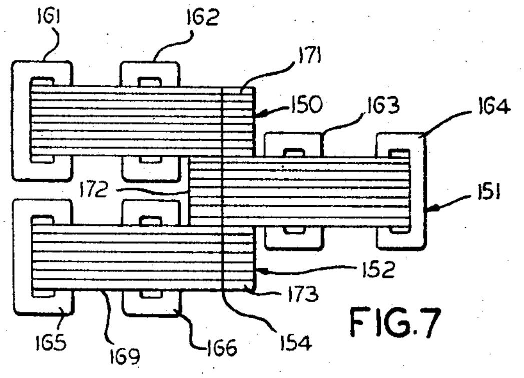
Figure 11:
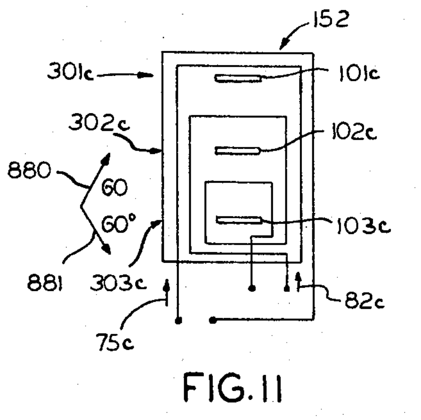
Figure 8:
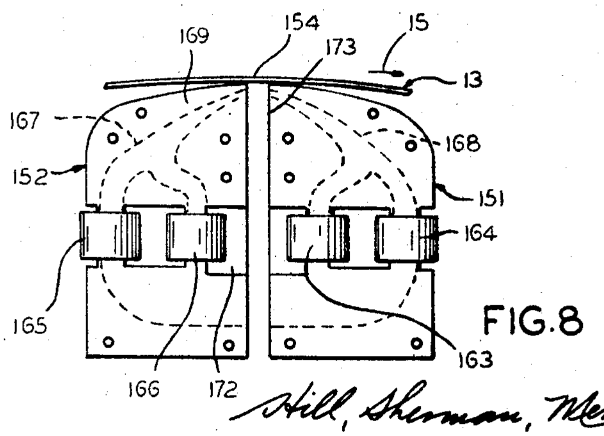
Figures 12, 13, 14:
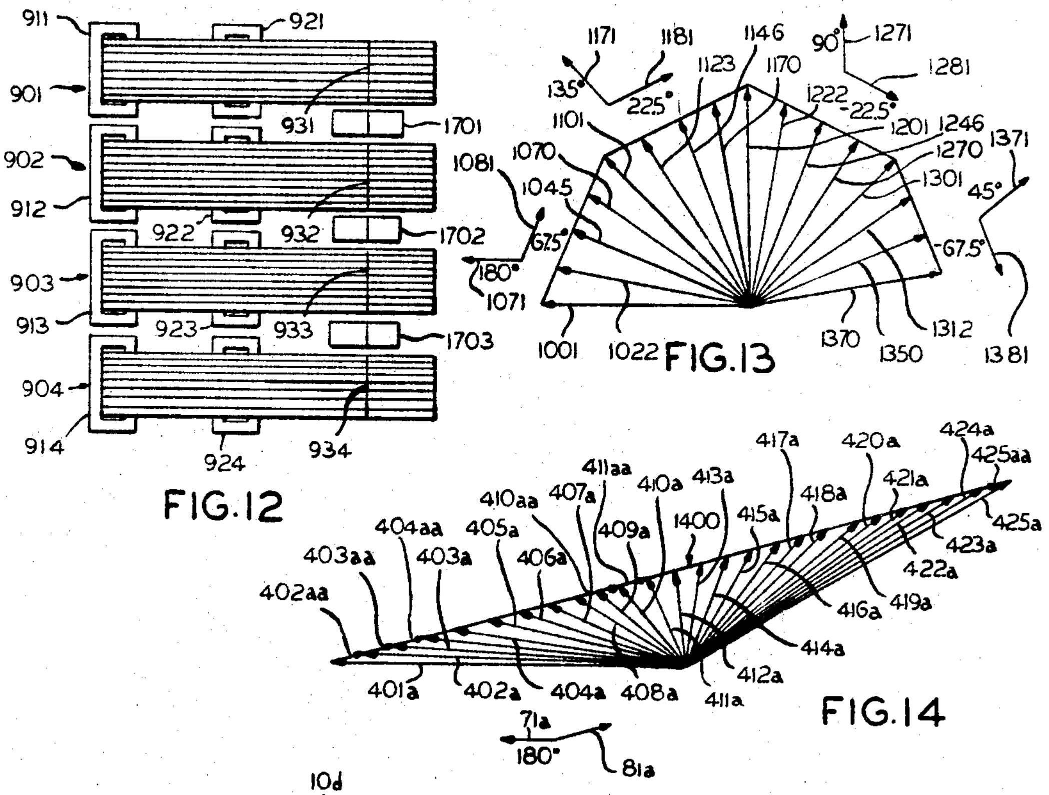
Figure 15:
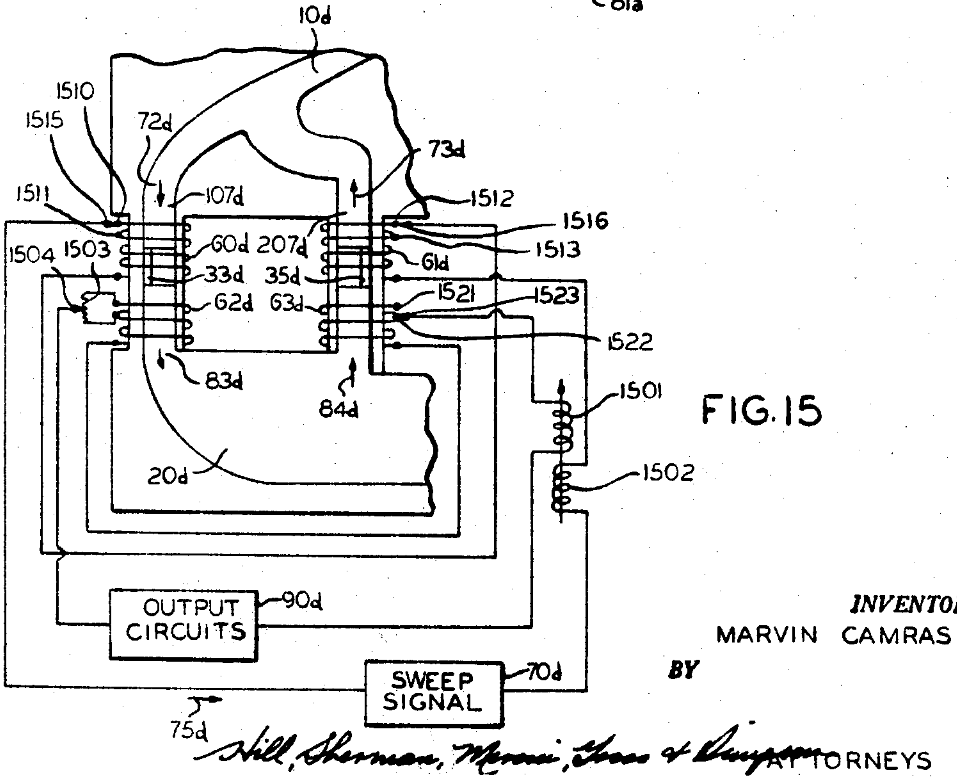
Figure 16:
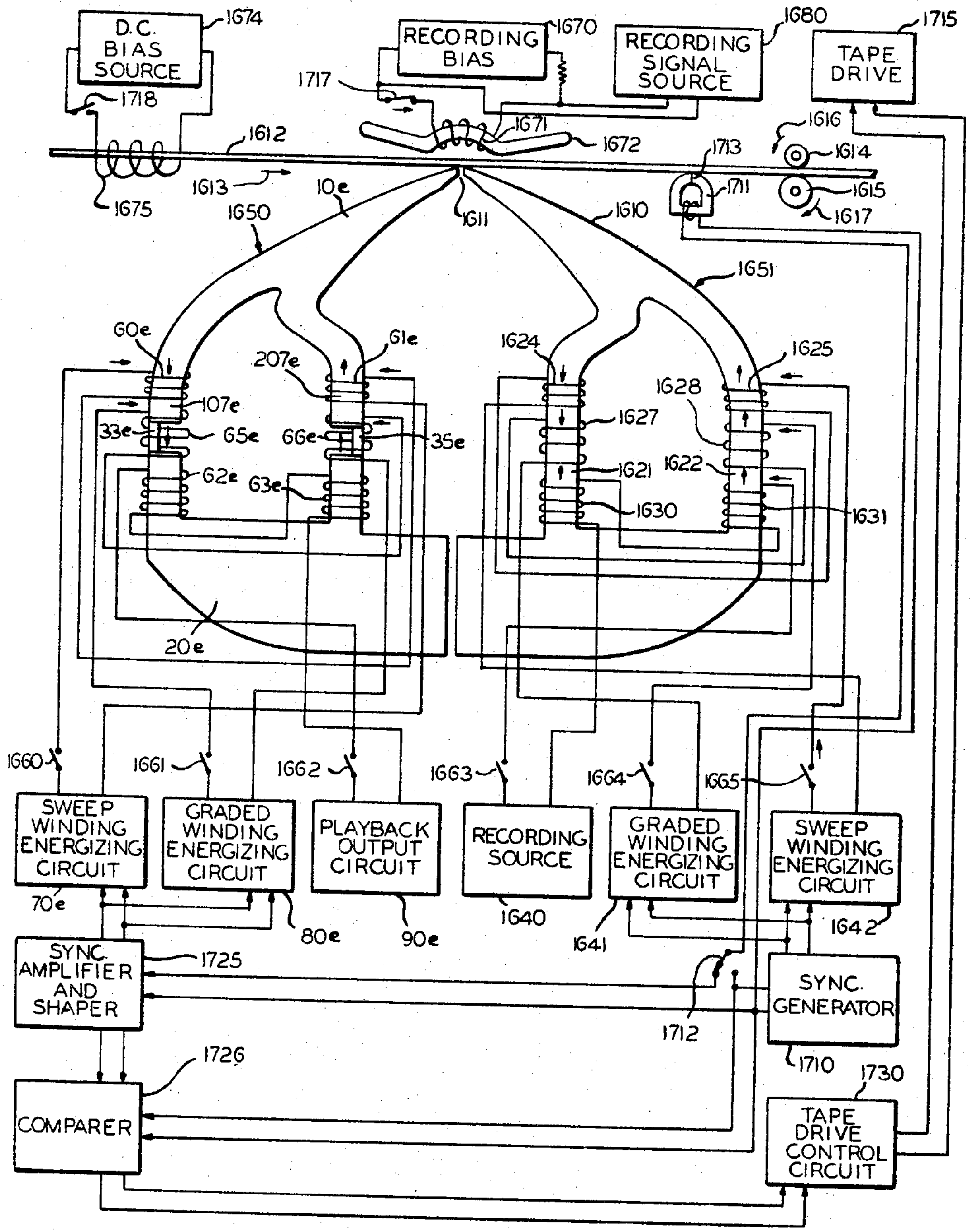

FIGURE 2A on sheet No. 6 of the drawings is an enlarged fragmentary horizontal sectional view similar to FIGURE 2;

FIGURE 3 is a diagrammatic view illustrating the winding arrangement for the head of FIGURE 1;

FIGURE 4 is a vector diagram which serves to illustrate the operation of the head of FIGURE 1 and is particularly related to the head configuration of FIGURES 7–11;

FIGURES 5A–5C represent the output from successive head units of the head assembly of FIGURE 1 in the absence of a signal flux;

FIGURES 6A–6C represent the output from the successive head units of FIGURE 1 where a signal flux from the record medium is threading the successive head units;

FIGURE 7 is a diagrammatic plan view showing an assembly of three groups of head units such as indicated in FIGURE 1;

FIGURE 8 is a somewhat diagrammatic side elevational view of the structure of FIGURE 7;

FIGURES 9, 10 and 11 are diagrammatic views indicating the winding patterns for the respective groups of head units shown in FIGURE 7;

FIGURE 12 is a somewhat diagrammatic plan view of a further head assembly in accordance with the present invention having four groups of head units;

FIGURE 13 is a vector diagram illustrating the operation of the head assembly of FIGURE 12;

FIGURE 14 is a vector diagram illustrating a different operation for a head assembly such as indicated in FIGURE 1;

FIGURE 15 is a fragmentary somewhat diagrammatic view illustrating various means for compensating for a lack of balance in the output circuits of a head assembly such as indicated in FIGURE 1;

FIGURE 16 is a diagrammatic illustration of a recording and playback system in accordance with the present invention utilizing a composite recording and playback head;

FIGURE 17 represents a plot of magnetic induction B as a function of applied magnetizing force for the portion of a record medium in coupling relation to a head unit at a given instant of time and diagrammatically illustrates the operation of FIGURE 16;

FIGURES 18 and 19 illustrate modifications of the embodiment of FIGURE 16 for improving the recording characteristics of the head of FIGURE 16.

FIGURE 1 illustrates a preferred lamination configuration for a video playback head in accordance with the present invention. The lamination configuration provides a pair of pole portions 10 and 11 for coupling to the magnetizable layer 12 of a magnetic record medium 13 which may travel successively across the poles and move in the direction of the arrow 15. A core portion 17 of the configuration may comprise a number of laminations and may include a pair of leg portions 107 and 207 and a base portion 20. A common core portion 22 may extend over the entire length of the head so as to define gaps such as indicated at 23 with each of a succession of core units such as indicated at 17. The common core section 22 may be of laminated construction, for example. As an alternative, a core section identical to the core section 17 may be substituted for the common core 22, but such a substitution increases the complexity and number of windings required for the complete head. A core shape as shown at 22 in FIGURE 1 but with individual core assemblies for each channel laterally separated by copper spacers between channels is advantageous for reducing coupling between adjacent channels.

Referring to FIGURE 2A on sheet No. 6 of the drawings, the laminations making up the core section 17 have been designated 25–30. The lamination 25 is notched as indicated at 25*a* in FIGURE 2A to provide a very thin cross section portion 33 at the central portion of the length of leg 107. Laminations 26–30 are completely cut away so that the magnetic path is constricted to the cross section of the portion 33 of lamination 25. Similarly the lamination 25 is notched centrally of the length of the leg 207 so as to provide a constricted area portion 35, while the laminations 26–30 are again completely interrupted at the region 35 so that the constricted portion 35 is the sole magnetic material in the region.

By way of example, the constricted portions 33 and 35 may have a length of .060 inch and a cross sectional area of $0.6\times10^{-6}$ to $2.5\times10^{-6}$ square inches and provide excellent results. The sensitivity above noise level may be increased by a further reduction in length or area. The laminations 25–30 may be of "Supermalloy" or a similar high permeability saturable alloy. "Supermalloy" may comprise 5% molybdenum. 79% nickel and the remainder iron and minor constituents. The lamination 25 may be from .0005 inch to .00012 inch thick. The additional laminations 26–30 build up the core section to the desired width of the channel to be reproduced from the record medium 13. The channel may, for example, be from .001 to .004 inch wide. For playback, the additional laminations 26–30 need not be extremely thin since they carry only the line frequency, which may be 15,750 cycles per second, while the thin portions 33 and 35 switch at a much higher frequency, for example 4.5 megacycles per second.

The successive core sections such as indicated at 17 in FIGURE 1 may be encased by shielding laminations such as indicated at 40 and 41 in FIGURE 2 of electrically conductive material. By way of example, the lamination 40 may be recessed as indicated at 40*a*, FIGURE 2A (Sheet No. 6), a sufficient distance to receive the stack of laminations 25–30. Suitable insulating means such as .00025 inch "Mylar" sheet is indicated at 43 and 44 for insulating the two copper laminations 40 and 41 so as to prevent a complete electric circuit linking the lamination. The successive laminations may be separated by a thin insulating film such as indicated at 44' in FIGURE 2A. Windows such as 40*c* and notches such as 40*d* and 40*e* may be provided in the shielding laminations 40 and corresponding openings 41*c*, 41*d* and 41*e* may be provided in laminations 41 (FIGURE 2A) to accommodate the various windings.

As indicated in FIGURE 1 the copper shielding members such as 40 and 41 may have cylindrical apertures therethrough as indicated at 50–55 in FIGURE 1 which receive elongated fastening means for retaining the successive core sections such as 17 in assembled relation.

By way of specific example, the magnetic laminations 25–30 making up the core section 17 may each have a thickness of .0005 inch and together with successive insulating films such as 44' therebetween may have an overall thickness of .004 inch. The copper shielding plates such as 40 and 41 may have thicknesses which, added together, provide an overall thickness of the core section 17 together with its copper shielding of .008 inch. A groove 41*a*, FIGURE 2A, about ¼" wide is provided in shielding member 41 to pass a turn of ribbon winding with its insulation such as indicated at 56 in FIGURE 2A. The pole pieces 10 and 11 may have parallel planar confronting areas with a height in the direction normal to the plane of the tape 13 of .005 inch, and the pole portions 10 and 11 may be separated by a copper gap spacer 23 having a thickness of .00025 inch.

Since the gap of each of the successive head units is defined at one side by the common pole piece 11 which extends over the entire width of the head assembly and which is polished to extreme flatness on its gap defining face, the gaps of the successive head units will be in exact alignment across the width of the tape 13.

It may be noted that a copper housing part 45 encases the elongated common core part 22 and that the copper housing 45 includes a core portion 45*a* integral therewith. Thus housing 45 has a recess 45*b* for receiving the successive laminations 22*a* making up the common core part 22. The core part 22 makes a relatively steep angle with the tape as indicated at 22*a* adjacent the tape path. This relatively steep angle enables the copper housing part 45 to overlie a major part of the pole portion 11 as indicated at 45*c* so as to tend to prevent flux leakage between adjacent head units. With this construction, only a small region of the pole portion 11 of the common core section 22 is exposed to the tape active surface. A further reduction in cross talk would be obtained by utilizing individual core sections of the configuration of core section 22 and having a width corresponding to the width of the core unit 17 and encased in a copper shield in the same manner as the core units 17. In this case the magnetic circuits of the successive head units would be entirely separated by copper shielding.

The method of sequentially switching or activating the successive head units may be similar to that of my prior application Serial No. 47,741 filed August 5, 1960, of which the present application is a continuation in part. The entire disclosure of said copending application is incorporated herein by reference.

Specifically, the legs 101–125 and 201–225 of the successive core units corresponding to legs 107 and 207 in FIGURE 1 may have respective sweep windings such as indicated at 60 and 61 in FIGURE 3 and may have output windings such as indicated at 62 and 63 in FIGURE 3. A graded winding for the series of legs 101–125 corresponding to leg 107 in FIGURE 1 is indicated at 65 in FIGURE 3, and a corresponding graded winding for the series of legs 201–225 corresponding to leg 207 in FIGURE 1 is indicated at 66 in FIGURE 3. For the illustrative case of a series of 25 head units making up a head assembly, the graded windings 65 and 66 would link the legs 101–125 and 201–225 with successively greater numbers of turns. For example, winding 65 may link core 101 with zero turns, core 102 with one turn, core 103 with two turns and so forth, linking core 125 with 24 turns. Also by way of example, the sweep windings 60 and 61 may link all of the head units in common with 24 turns. A sweep energizing circuit 70 indicated in FIGURE 3 may deliver a sinusoidal output current waveform as represented by vector 71 in FIGURE 4 which at a given instant may produce magnetic flux in the direction of arrow 72 in core leg 107 and in the direction of arrow 73 in core leg 207. If it be assumed that the positive direction of sweep current is as indicated by arrow 75 in FIGURE 3, the ribbon energizing circuit indicated at 80 in FIGURE 3 may supply a sinusoidal current corresponding to vector 81 in FIGURE 4 and having a direction of positive flow as indicated by arrow 82 in FIGURE 3 so as to establish fluxes in the legs 107 and 207 instantaneously as indicated by arrows 83 and 84 in FIGURE 1.

FIGURE 4 has been constructed to illustrate the operation of three groups of cores such as indicated in FIGURES 7 and 8, but will also be utilized in explaining the embodiment of FIGURE 3 wherein 25 cores have been shown by way of illustration. Thus, relating the vector diagram of FIGURE 4 specifically to the embodiment of FIGURE 3, the vertical component of vector 401 may represent the magnetomotive force variation with time in the core leg 101 with the entire vector diagram assumed to be rotating in the counterclockwise direction at a frequency corresponding to the frequency of the sweep current from circuit 70 and the ribbon current from circuit 80 in FIGURE 3. It will be noted that the vector 401 is illustrated as being in phase with the sweep current vector 71 so that the leg 101 is switching from positive to negative saturation at the instant of time indicated in FIGURE 4. Vector 407 may represent the net magnetomotive force in core leg 107 in FIGURE 3, vector 413 may represent the magnetomotive force in leg 113, vector 419 may represent the magnetomotive force in leg 119 and vector 425 may represent the magnetomotive force in leg 125. The magnetomotive force vectors for legs 102–106 would be represented by successive vectors in FIGURE 4 lying between vectors 401 and 407, vectors for legs 108–112 would lie successively between vectors 407 and 413 in FIGURE 4, and so forth. The magnetomotive force represented by vector 407 in FIGURE 4, for example, may be thought of as having a component in phase with the sweep current vector 71 and having a magnitude identical to the magnitude of vector 401, and a component **407*a* in phase with the ribbon current vector 81 and having a magnitude proportional to the number of turns of graded winding 65 linking the leg 107. For example, if zero graded turns link core leg 101, six turns of winding 65 may link core leg 107. Similarly vector 413 comprises a component corresponding to vector 401 in FIGURE 4 and a component corresponding to vector 413*a* extending from the tip of vector 401 to the tip of vector 413**.

As the vector diagram of FIGURE 4 rotates in the counterclockwise direction, the vertical component of the vector 401 representing the instantaneous value of the magnetomotive force in core leg 101 switches from a positive value through zero to a negative value instantaneously activating the core leg 101. At succeeding instants of time, core legs 102–106 are switched from a positive saturation to a negative saturation. At the next instant of time, the vertical component of vector 407 would assume a zero condition and core leg 107 would then be switching from positive saturation through a neutral condition to negative saturation.

With a zero signal from the record medium 13, the voltages induced in the output windings 62 and 63 would be as indicated in FIGURES 5A and 5B. Thus, at the instant of time represented in FIGURE 4, leg 101 of head unit 301 is switching from positive to negative saturation and would produce an output pulse as indicated at 501 in FIGURE 5A in output winding 62. (Arrows 72 and 73 in FIGURE 1 may be taken as representing a positive direction of magnetomotive force.) If the voltage pulse 501 is arbitrarily considered to be of negative polarity, then the voltage pulse induced in output winding 63 as the corresponding core leg 201 is switched from positive to negative polarity of saturation would be of positive polarity as represented by pulse 501′ in FIGURE 5B with respect to the series electric circuit including windings 62 and 63. The net output from the output windings 62 and 63 would then be zero as represented in FIGURE 5C. At a succeeding instant of time, core leg 102 of head unit 302 would switch from a positive polarity of saturation to a negative polarity of saturation producing a voltage pulse 502 in the output winding 62 while switching of leg 202 would produce a voltage pulse 502′ of opposite polarity. The same action would occur for each of the other head units such as 303–325 in the absence of a signal flux therein. With proper balance between the various windings, therefore, the output circuit 90 will receive a zero signal in the absence of a signal flux from the tape as the head units are successively activated.

If now a signal is present on the tape producing a signal flux in one of the head units such as indicated by arrow 91 for the head unit 307 in FIGURE 1, the result will be with respect to core leg 107 for example, that with the vertical component of vector 407 equal to zero corresponding to a balance between the instantaneous values of magnetomotive force applied to the leg by current flow (represented by vectors 71 and 81 in FIGURE 4) in windings 60 and 65 the leg will still have a net flux therein corresponding to the value of the signal flux and will not be in a magnetically neutral condition. However, at a succeeding instant of time as the sweep magnetomotive force in leg 107 (which is in phase with current vector 71, FIGURE 4) becomes increasingly negative, a point will be reached where the net flux in the leg 107 is switched from a positive to a negative value. Thus, the voltage pulse 607 produced in the output winding 62 upon switching of leg 107 as indicated in FIGURE 6A will be slightly delayed as compared to the time of occurrence of pulse 507 in FIGURE 5A in the absence of a signal flux. The result of a similar signal flux in head units 301–306 and 308 is also indicated in FIGURE 6A.

If the positive direction of magnetomotive force for the core legs such as 107 and 207 in FIGURE 1 is taken to be the counterclockwise direction of circulation then arrows 72 and 73 represent positive values of sweep magnetomotive force, while arrows 83 and 84 represent positive polarities of ribbon or graded winding produced magnetomotive force. Thus, at the instant of time when the magnetomotive force represented by vector 407 in FIGURE 4 is shifting from positive to negative polarity, the magnetomotive force due to windings 61 and 66 in leg 207 will be shifting from a positive value (corresponding to the direction of arrow 73 in FIGURE 1) to a negative value, and vector 407 in FIGURE 4 may also represent the magnetomotive force variation in leg 207. As the magnetomotive force in leg 207 approaches zero, it will be observed that the signal flux 91 will be in opposing relation to the graded winding magnetomotive force (which is represented by arrow 84 in FIGURE 1) so that the core leg 207 will reach a magnetically neutral condition prior to the time when the magnetomotive force represented by vector 407 reaches the zero value. Accordingly, a voltage pulse will be induced in output winding 63 prior to the instant of time of voltage pulse 507′ in FIGURE 5C and this has been represented at 607′ in FIGURE 6B. The resultant induced voltage in the two windings in series will be as represented by the waveform 607″ in FIGURE 6C. Similarly, the waveform for head units 301–306 and 308 when the core legs 101–106, 108 and 201–206 and 208 are receiving a signal flux from the corresponding channels on the tape 13 of the polarity indicated at 91 in FIGURE 1, the voltage pulses will be offset as indicated in FIGURES 6A and 6B and the resultant waveform will be as indicated in FIGURE 6C.

Where the polarity of the signal flux is opposite to that shown in FIGURE 1, output pulses such as 601 will lead the corresponding output pulses such as 601′ to shift the phase of the resultant output waves from that shown in FIGURE 6C, so that each wave would have a negative pulse polarity followed by a positive pulse polarity, instead of the positive-negative sequence of FIGURE 6C.

When the output waveform such as indicated in FIGURE 6C is demodulated the original variable amplitude variable polarity signal recorded on the tape is obtained.

Even with no signal present in a head unit such as shown in FIGURE 1 the cancellation of the signals produced in the respective output windings on the legs such as 107 and 207 is not absolutely perfect, so that there is a regular residual signal or "switching transient" during each sweep of the successive head units. This is reduced to negligible proportions where the volume of saturable material is kept small in relation to the volume of magnetic material of the effective signal source and where the reluctance of the saturable parts (portions 33 and 35 in FIGURE 1) is of the same order of magnitude as the reluctance of the gap 23 including leakage. Other factors of importance are a back gap 92 of low reluctance, approximately equal reluctances in the signal paths provided by legs 107 and 207, operation at optimum sweep current levels, shielding or balancing out the earth's magnetic field, selection of magnetically balanced head units by means of a tester, and properly annealed sensitive portions 33 and 35 free from unbalanced stresses.

While the head has been described in terms of playback operation, the head is also applicable to recording, and to other uses of the invention such as analogue to digital conversion, frequency multiplication, area scanning and the like.

A cross section for the restricted portions 33 and 35 of FIGURE 1 of 5 mils by ½ mil (2.5 square mils or .0000025 square inch) is a compromise between sensitivity, balance and mechanical considerations. Heads have also been tested with restricted portions having a cross section of 5 mils by .12 mil (0.6 square mil) with excellent results, but a shorter length should go along with the reduced area to give optimum reluctance for this part of the magnetic circuit. Shorter lengths of about 15 mils (.015 inch) decrease the ampere turn requirements of the sweep system, and reduced area decreases the residual sweep transient signal for the same degree of balance.

One pair of saturable members such as the pair 107, 207 of head unit 307 in FIGURE 1 instead of two pair (as would be present in a symmetrical head unit configuration) has proved easier to balance. It appears that record heads can be made in the same design, which cuts their complexity in half, and allows separate sections to be stacked along the width of a common section to give a continuous gap without coil interference. Since the main body of the reproducing head may carry a maximum frequency of only 15,750 cycles per second (the video line frequency) it can be made of thicker laminations than the saturable portions 33 and 35, and this also simplifies the construction.

A test fixture has been utilized for checking the balance between the legs of individual head units prior to assembly. The test fixture has plug-in blocks which rapidly place ten turns of winding over the sensitive leg portions of the head unit. Balance between the two legs such as 107 and 207 in FIGURE 1 and the sensitivity are then rapidly determined.

It appears that greatest sensitivity occurs in playback at a lower sweep current level than in recording. This points to a thinner section of the saturable portions such as 33 and 35 in FIGURE 1 which is readily obtained by omitting some of the laminations in this region of each head, but retaining the full width at the pole surfaces which contact the tape.

A single channel head was made of the same components as a single channel of the multi-channel head indicated in FIGURES 1–3 and various locations were tried for the windings. The objectives were to balance out the fundamental or sweep signal, and to maximize the output generated by tape flux in the gap. Balance proved to be fairly sharp, and was affected by stresses in the laminations. When properly balanced, extreme sensitivity was obtained; the earth's magnetic field was sufficient to give outputs corresponding to saturation of the sensitive core portion.

A ring modulator circuit may be utilized to demodulate the output waveform such as indicated in FIGURE 6C. Such a circuit modulates the head output with a sinusoidal waveform which is twice the frequency of the sweep and graded winding currents. The output from the ring modulator circuit is the product of the output signal from the head and the excitation signal, and the resultant signal has an output polarity which reverses upon reversal of the recorded magnetization. It was found that the same result could be obtained more simply by use of a resonant circuit tuned to the second harmonic or by a differentiating circuit in the head output.

FIGURES 7 and 8 illustrate successive groups of head units 150, 151 and 152 arranged so as to have the gaps of successive head units form a straight line as indicated at 154 extending at right angles to the direction of tape movement. Each of the groups may have seventy or more head units depending on the resolution desired. The units may each have magnetic circuits as shown in FIGURE 1. The windings for the successive groups corresponding to the windings shown in FIGURES 1 and 3 are designated by the reference numerals 161, 162, 163, 164, 165 and 166. It will be noted that the head laminations such as indicated at 167 for groups 150 and 152 may be thought of as having the orientation shown for lamination 17 in FIGURE 1, while the head units of group 151 will be arranged with laminations such as 168 corresponding to a mirror image of the head lamination 17 shown in FIGURE 1. It will be noted that the widths of the common head portions of each group such as indicated at 171, 172 and 173 are dimensioned so as to lie inwardly of the adjacent windings such as 162, 163 and 166. Each head unit may have its wound laminations encased by metal shielding members such as 169 each of which comprises parts such as shown at 40 and 41 in FIGURES 1, 2 and 2A.

The diagram of FIGURE 4 may be thought of as representing the operation for the embodiment of FIGURES 7 and 8, vectors such as 401–425 would represent the operation of respective ones of the first group of seventy or more head units designated by the reference numeral 150, vectors such as 701–770 would correspond to a group of 70 head units as indicated at 151 in FIGURE 7, and vectors 801–870 would represent the operation of successive head units of the group 152 in FIGURE 7. In order to achieve sequential switching action of the successive head units of the successive groups, sweep currents as represented by vectors 71, 780 and 880 in FIGURE 4 would be supplied to sweep windings of the respective groups 150, 151 and 152, and currents as represented by vectors 81, 781 and 881 in FIGURE 4 would be delivered to the graded windings of the respective groups 150, 151 and 152.

FIGURES 9, 10 and 11 illustrate the winding patterns for the head assembly of FIGURES 7 and 8 in a diagrammatic fashion. Thus FIGURE 9 illustrates the winding pattern for the head group 150 in FIGURE 7; FIGURE 10 illustrates the winding pattern for group 151; and FIGURE 11 illustrates the winding pattern for group 152. Specifically FIGURE 9 may illustrate diagrammatically core legs **101*a*, 102*a* and 103*a* each corresponding in configuration to the leg 107 of head unit 307 shown in FIGURE 1. The group 150 if shown in its entirety would, of course, also include legs corresponding to leg 207 in FIGURE 1 for each of the head units such as generally designated 301*a*, 302*a* and 303*a* in FIGURE 9, and there might be a total of 70 head units in the group 150 all of which would be linked by a sweep winding 60*a* and which would receive successively greater numbers of turns of the graded winding 65*a*. Thus the 70th core unit (which might be designated 370*a* but which is not shown) of the group 150 would also be linked by the sweep winding 60*a* and would receive 69 turns of the graded winding 65*a*. The positive direction of sweep current has been indicated by arrow 75*a* in FIGURE 9 and the positive direction of graded winding current has been indicated by arrow 82*a* in FIGURE 9 to indicate the directions of current flow for positive instantaneous values of the currents represented by vectors 71 and 81**, respectively, in FIGURES 4 and 9.

Similarly for FIGURE 10, legs of configuration corresponding to that of leg 107 in FIGURE 1 have been successively designated **101*b*, 102*b* and 103*b* for the head unit group 151 of FIGURE 7 and the successive core units have been designated 301*b*, 302*b* and 303*b* to indicate their close correspondence to the diagrams of FIGURES 1 and 3 as previously explained with respect to FIGURE 9. The positive direction of the sweep current is represented by arrow 75*b* and the positive direction of graded winding current is represented by arrow 82*b*. The respective currents are represented by vectors 780 and 781 in FIGURES 4 and 10 which vectors are considered as rotating in the counterclockwise direction at 7,875 revolutions per second to correspond to a frequency of the sweep and graded winding currents of 7,875 cycles per second. The instantaneous magnetic condition of leg 101*b* in FIGURE 10 is represented by vector 701 in FIGURE 4; the net magnetomotive force variation in leg 102*b* is represented by vector 702 in FIGURE 4; and the net magnetomotive force variation in leg 103*b* in FIGURE 10 is represented by vector 703 in FIGURE 4. Vector 701 is in phase with the sweep current vector 780 and has zero graded turns thereon, while leg 102*b* may have a single turn of graded winding 65b so as to lag vector 701 by a small angle. By way of example if vector 701 is at an angle of 120° and vector 801 is at an angle of 60° measured counter-clockwise from the horizontal axis, the angle between successive vectors such as 701 and 702 might be substantially $\pi/210$ radians. A vector such as 702 may thus be thought of as having a component corresponding to vector 701 in phase with the sweep current vector 780 and a component 702a in phase with the graded winding current vector 781 as diagrammatically indicated in FIGURE 4. The magnitude of the vector 702a would represent $1/69$ the magnitude of the vector 770a representing the component of vector 770 in phase with the graded winding current vector 781**.

Similarly FIGURE 11 illustrates head units 301c, 302c and 303c of group 152 in FIGURE 7 and legs 101c, 102c 103c may have net magnetomotive force variations as represented by vectors 801, 802 and 803 in FIGURE 4. Vector 801 is in phase with the sweep winding current vector 880, while vector 802, for example, has a component corresponding to vector 801 in phase with the sweep current vector 880 and has a further component 802a in phase with the graded winding current vector 881 and equal to $1/69$ the magnitude of the component 870a of vector 870 which is in phase with the graded winding current vector 881.

It will be apparent that the operation of legs 101a, 102a and 103a in FIGURE 9 may be represented by vectors such as 401, 402 and 403 in FIGURE 4 providing the vectors have an angular separation of $\pi/210$ radians corresponding to a total of 70 head units rather than a separation of $\pi/75$ radians as would be the case with the 25 head units indicated in FIGURE 3. Since the number of vectors corresponds to the number of head units and all of the vectors could not be conveniently shown in a diagram such as indicated in FIGURE 4 in any event, it is believed that FIGURE 4 is a sufficient showing both for the system of FIGURE 3 and for the system of FIGURES 7–11. In each case, the basic head unit configuration may be the same and may be as indicated in FIGURES 1, 2 and 3, for example. Since the operation of the embodiment of FIGURES 7 and 8 clearly corresponds to that of FIGURES 1–3, a detailed repetition of the explanation of operation is deemed unnecessary. It will be noted, however, with respect to FIGURE 4, that the successive core units 301a, 302a, 303a, etc. would be successively switched from positive to negative saturation in the first 60° of rotation of the diagram of FIGURE 4, the head units such as 301b, 302b, 303b, etc. would then be switched from positive to negative saturation as the vector diagram of FIGURE 4 rotated between 60° and 120° from the position shown in FIGURE 4, and the head units such as 301c, 302c, 303, etc. would be successively switched from positive to negative saturation during rotation of the vector diagram between 120° and 180° from the position shown in FIGURE 4. Thereafter, head units of the 301a series would be successively switched from negative to positive saturation followed by the successive head units of the 301b and the 301c series, after which a new cycle would occur beginning with head unit 301a being switched from positive to negative saturation after rotation of the vector diagram of FIGURE 4 through 360° from the position shown.

It is, of course, not practical or necessary to illustrate all 70 head units of each group in FIGURES 9–11; those skilled in the art will readily understand the principle involved from the representative illustrations of FIGURES 9–11 in conjunction with FIGURE 4.

FIGURE 12 illustrates a further modification wherein groups of head units which may be designated 901, 902, 903 and 904 comprise head units such as indicated in FIGURES 1 and 2 with windings such as indicated at 911–914 and 921–924 thereon comprising sweep windings, graded windings and output windings in the same manner as generally indicated in FIGURE 3.

Assuming again 70 head units per group, the vector diagram of FIGURE 13 would illustrate the operation of the groups where each 45° sector of the vector diagram would comprise 70 equally spaced vectors corresponding to one of the successive groups. Thus vectors such as 1001, 1022, 1045 and 1070 in FIGURE 13 would represent the magnetomotive force vectors for head units which would correspond to numbers 1, 22, 45 and 70 of a series of 70 numbers representing group 901; vectors 1101, 1123, 1146 and 1170 would represent the net magnetomotive force vectors for head units numbers 1, 23, 46 and 70 of group 902; vectors 1201, 1222, 1246 and 1270 in FIGURE 13 would represent the magnetomotive force variation in head units numbers 1, 22, 46 and 70 in group 903; and vectors 1301, 1312, 1350 and 1370 in FIGURE 13 would represent the magnetomotive force vectors for head units numbers 1, 12, 50 and 70, respectively, for group 904. The first group 901 would receive a sweep current as represented by vector 1071 and would receive a graded winding current as represented by vector 1081. The vector 1071 has an instantaneous angle of 180° in FIGURE 13, while the vector 1081 has an instantaneous angle of 67.5° measured counterclockwise from the horizontal base line of FIGURE 13. Similarly the sweep current for group 902 would be as represented by vector 1171 in FIGURE 13 having an angle of 135° and the graded winding current would be as represented by vector 1181 in FIGURE 13 having an angle of 22½°. For the third group 903 in FIGURE 12, the sweep current would be represented by vector 1271 having an angle of 90° and the graded winding current would be as represented by vector 1281 having an angle of minus 22½° from the horizontal base line of FIGURE 13. With respect to group 904, the sweep winding would receive a sweep current as represented by vector 1371 in FIGURE 13 having an angle of 45° and the graded windings would receive a current as represented by vector 1381 having an angle of −67.5°. In FIGURE 13, with the assumed 70 cores per group, the angle between successive vectors would be substantially $\pi/280$, so that the angle between vectors 1001 and 1022, for example, would be substantially $21\pi/280$, while the angle between vectors 1022 and 1045 would be substantially $23\pi/280$.

With a system such as shown in FIGURE 12 having a winding pattern and excitation as represented in FIGURE 13, the successive cores which may be represented by numbers 1 through 70 of group 901 would first shift from positive to negative polarity of saturation, then the successive cores of groups 902, 903 and 904 would switch in sequence in the same way as described with respect to FIGURE 4. After 180° of rotation of the vector diagram of FIGURE 13, core number 1 of group 901 in FIGURE 12 would be switching from negative to positive saturation and the successive head units of the successive groups would follow switching from negative to positive saturation in sequence after which core No. 1 of group 901 would again switch from positive to negative saturation after a 360° revolution of the vector diagram of FIGURE 13.

In each of the embodiments, as has been mentioned, the vector diagram is considered as rotating in the counterclockwise direction with a number of revolutions per second corresponding to ½ the line rate of a video signal being scanned. The same operation is applicable during recording as will be described in detail hereinafter.

FIGURE 14 illustrates a vector diagram for a series of head units of a single group wherein the head units of the group are switched in sequence over a substantial proportion of the total scanning cycle.

For convenience, the significance of the vector diagram of FIGURE 14 may be applied to the head configuration represented by FIGURES 1, 2 and 3. In this case a vector 401a would represent the magnetomotive force vector for core leg 101 in FIGURE 3, vector 402a would correspond to the operation of leg 102 in FIGURE 3 and so forth. The sweep winding would supply a current in phase with the magnetomotive force vector 401*a* as represented by vector 71*a* in FIGURE 14, and the graded winding current represented by vector 81*a* in FIGURE 14 would be parallel to the line or envelope designated generally by reference numeral 1400 connecting the heads of vectors 401*a*–425*a*. By way of example, vector 425*a* may be at an angle of 30° in FIGURE 14, so that the single group of head units represented in FIGURE 14 will operate through 300° of the rotation of the vector diagram 14 (5/6 of each cycle).

In one embodiment in accordance with FIGURE 14, a linearly graded winding such as indicated at 65 in FIGURE 3 may be utilized which receives the current represented by vector 81*a* in FIGURE 14. In this case, the component of vector 402*a* in phase with vector 81*a* designated 402*aa* will be ½ the magnitude of the vector 403*aa*, ⅓ the magnitude of vector 404*aa* and 1/24 the magnitude of vector 425*aa* in phase with current vector 81*a*. With such linear grading, it will be apparent that the longer vectors such as 401*a*, 402*a*, 403*a*, 423*a*, 424*a* and 425*a* will be separated by relatively smaller annular distances while the shorter vectors such as 411*a*, 412*a*, 413*a* and 414*a* will be separated by relatively greater distances. Thus, there will not be a uniform time separation between switching of the successive head units with a linear graded winding. This may not be important if reproduced with a similar head, which would read the signals at the same rate at which they were written.

On the other hand, the difference in numbers of turns on the successive head units may vary so as to provide a relatively equal angular spacing between the successive vectors in FIGURE 14. Thus, the longer vectors such as 401*a* and 402*a* might have a greater difference in turns of the graded winding between adjacent cores to provide relatively large components in phase with the current in graded winding 81*a* corresponding to components 402*aa* and 403*aa* in FIGURE 14. On the other hand the difference in magnitudes between components such as 410*aa* of vector 410*a* and 411*aa* of vector 411*a* could be relatively small. To illustrate a specific arrangement of nonlinearly graded windings, the successive core legs 101–125 might have numbers of graded windings thereon as indicated in the following table:

TABLE I.—(MODIFIED FIGURE 14)

| Head Unit No. | Leg Ref. No. (FIG. 3) | Vector Component | No. of Turns of Graded Winding |
|---|---|---|---|
| 1 | 101 | 401aa | 0 |
| 2 | 102 | 402aa | 14 |
| 3 | 103 | 403aa | 23 |
| 4 | 104 | 404aa | 28 |
| 5 | 105 | (405aa) | 32 |
| 6 | 106 | (406aa) | 35 |
| 7 | 107 | (407aa) | 37 |
| 8 | 108 | (408aa) | 39 |
| 9 | 109 | (409aa) | 41 |
| 10 | 110 | 410aa | 43 |
| 11 | 111 | 411aa | 45 |
| 12 | 112 | (412aa) | 46 |
| 13 | 113 | (413aa) | 47 |
| 14 | 114 | (414aa) | 48 |
| 15 | 115 | (415aa) | 49 |
| 16 | 116 | (416aa) | 50 |
| 17 | 117 | (417aa) | 52 |
| 18 | 118 | (418aa) | 54 |
| 19 | 119 | (419aa) | 56 |
| 20 | 120 | (420aa) | 58 |
| 21 | 121 | (421aa) | 61 |
| 22 | 122 | (422aa) | 65 |
| 23 | 123 | (423aa) | 70 |
| 24 | 124 | (424aa) | 79 |
| 25 | 125 | 425aa | 93 |

The reference numerals not found in FIGURE 14 are shown in parenthesis in Table I.

An analytical expression may be worked out to give the grading that will be closest to linearity, or the grading can be determined from a vector diagram such as FIGURE 14 by scaling the distances when the vectors are laid out with equiangular spacing between them.

In operation, the sweep and graded winding currents corresponding to vectors 71*a* and 81*a* would have a frequency equal to one-half the line frequency of a video signal to be recorded or reproduced and the sweep current would lead the graded winding current by an angle of approximately 160° as indicated in FIGURE 14. The result of this energization would be the sequential switching of the successive legs such as 101–125 first from positive to negative saturation during an interval corresponding to rotation of the vector diagram of FIGURE 14 through 150°, followed by an inactive period corresponding to 30° of rotation of the vector diagram, after which the successive legs would be switched from negative to positive saturation in sequence during a further 150° of rotation of the vector diagram, and finally there would be a further 30° blank period before the cycle was repeated. The blank intervals could be a proportion of the scanning cycle corresponding to the retrace time between successive lines of a video signal so that the entire line of video information recorded on a tape could be scanned by a single head group such as represented in FIGURE 14.

It will be noted that in FIGURE 14 there is a relatively substantial difference in the amplitude of the net magnetomotive force vectors. This will produce a corresponding difference in output pulses induced in the output windings of the system. The greater the number of groups of head units such as indicated in FIGURES 4 and 13, the more nearly equal will be the magnitudes of the successive magnetomotive force vectors. The greater the number of groups, the more nearly the envelope of the tips of the vectors approaches a perfect circle.

FIGURE 15 is a view of a head unit configuration similar to lamination 17 in FIGURE 1 comprising legs 107*d* and 207*d*, pole 10*d* and base portion 20*d* for cooperating with a lamination such as indicated at 22 in FIGURE 1 or with a lamination which is a mirror image of the lamination shown in FIGURE 15. As illustrated in FIGURE 3, an overall sweep winding 60*d* links the successive legs such as leg 107*d* of the successive head units in common, and a corresponding sweep winding 61*d* links the legs such as 207*d* of the head units in common and this has been diagrammatically indicated in FIGURE 15. Similarly, an output winding 62*d* links one set of legs and an output winding 63*d* links the other set of legs. Of course the graded windings as indicated in FIGURE 3 at 65 and 66 would link the successive legs of each set with successively greater numbers of turns, but this has not been shown in FIGURE 15 for simplicity.

It will be appreciated that the output windings 62*d* and 63*d* are connected in opposing relation with respect to the sweep fluxes such as indicated at 72*d* and 73*d* and with respect to the graded winding fluxes such as indicated at 83*d* and 84*d* as has been explained in connection with FIGURE 5. For the case of perfect balance between the legs such as 107*d* and 207*d* and between the windings 60*d* and 61*d*, and the corresponding graded windings, theoretically there would be a zero induced voltage at the output circuit's component 90*d* in the absence of a signal flux, as indicated in FIGURE 5C. As a practical matter, however, it would be extremely difficult to achieve perfect balance of windings and magnetic circuits. To balance out any residual induced voltage in the absence of a signal, mutual inductance means such as indicated at 1501 and 1502 in FIGURE 15 may be provided between the sweep circuit and the output circuit which provide a polarity and degree of coupling to exactly balance out any residual unbalance in the circuit of FIGURE 15, particularly at the fundamental sweep frequency.

As a further or alternative adjustment, a potentiometer 1503 may be provided which is connected across one or more turns of one of the output windings such as 62*d*. By adjustment of the moving contact 1504 of the potentiometer an extremely fine adjustment for balance between the sweep, graded windings and output windings may be achieved. As a further alternative means, one of the various windings or several of the windings may be piovided with successive taps such ast indicated at 1510, 1511, 1512 and 1513 on the sweep windings 60*d* and 61*d*. A movable contact means as indicated at 1515 and 1516 m..y selectively engage one or another of the taps 1510–1513 to achieve a closer balance of the circuits in the absence of a signal flux. Such as expedient may also be applied to the output windings as indicated by taps 1521 and 1522 and moving contact means 1523 for output winding section 63*d*. Where there is an unbalance with equal numbers of turns for winding sections 60*d* and 61*d*, and 62*d* and 63*d*, the number of turns for any of the winding sections may be increased or decreased by means of such taps by a single turn or by several turns to produce a balanced condition.

FIGURE 16 illustrates a composite record-playback head which provides somewhat better recording characteristics than the head of FIGURES 1–3. In this case, the left hand section of the head may be similar to that shown in FIGURE 1 and corresponding reference numerals followed by the letter *e* have been applied. The right hand section is similar to a mirror image of the left hand section except that the reduced cross section portions 33*e* and 35*e* have been omitted so as to provide a greater cross section of magnetic material in the legs to which the recording signal windings are applied. In the embodiment of FIGURE 16, sweep, graded and playback output windings would be applied to the legs 107*e* and 207*e* exactly as indicated in FIGURES 1–3, and this section of the head would be activated during the playback operation.

As indicated in FIGURE 16, the recording section of the head units may comprise a pole portion 1610 defining a gap 1611 with the pole portion 10*e* for coupling to a magnetic tape record medium 1612 moving in the direction of arrow 1613 under the impetus of a constant speed drive means 1614, 1615 comprising drive rollers rotating in the direction of arrows 1616 and 1617. The recording unit section comprises two legs 1621 and 1622 having a cross section corresponding to the maximum cross section of legs 107*e* and 207*e*. The legs 1621 and 1622 have sweep windings 1624 and 1625 linking the legs of the successive head units in common in the same manner as sweep windings 60 and 61 in FIGURE 3 and have graded windings 1627 and 1628 linking the successive legs with successively different numbers of turns in the same way as the windings 65 and 66 in FIGURE 3. The recording signal windings 1630 and 1631 link the legs of the head units corresponding respectively to legs 1621 and 1622 in common and are supplied from a recording signal source 1640 to produce recording signal fluxes which are in aiding relation at the gap 1611.

The vector diagrams of FIGURES 4, 13 and 14 in conjunction with the head assemblies of FIGURES 1, 7, 12 and 15 are equally applicable to recording and these head assemblies are specifically disclosed as having recording circuitry associated with windings 60–63, 65 and 66, 161–166, 911–914 and 921–924 as illustrated for the recording section in FIGURE 16. The head unit configuration of FIGURE 16 may, of course, be imbedded in coper shielding material as indicated in FIGURES 2 and 2A and this embodiment should be considered as being specifically disclosed herein. Similarly, FIGURE 16 should be considered as disclosing the case of a playback head wherein each head unit has the configuration of left-hand core section 1650 and a corresponding mirror image core section defining a playback gap and having windings corresponding to those of core section 1650 energized from circuits 70*e*, 80*e* and 90*e*. Further, FIGURE 16 should be considered as disclosing a recording head wherein each head unit comprises a core section 1651 and a mirror image core section defining the recording gap with each core section receiving windings as indicated for core section 1651 in FIGURE 16. The playback head unit with four constricted portions such as indicated at 33*e* and 35*e* would, of course, be encased in shielding material as indicated in FIGURES 2 and 2A as would the recording head unit having four large cross section legs such as indicated at 1621 and 1622 in FIGURE 16.

With respect to the composite head unit indicated in FIGURE 16 which is operable both for recording and playback, a series of switches 1660–1665 have been indicated for switching the head unit between recording and playback modes. During recording, sweep winding and graded winding energizing circuits 1641 and 1642 may deliver current waveforms identical to those delivered by circuits 70*e* and 80*e* during playback, but the recording amplitudes may be somewhat higher for optimum recording operation. The vector diagram of FIGURE 4 or FIGURE 13 or FIGURE 14 would be directly applicable to the recording and playback operations of the head of FIGURE 16 or any of the modifications described above.

With respect to any of these modifications, the recording operation may be as illustrated in FIGURE 17 involving the supply of a steady direct current bias from a recording bias source 1670 to a winding 1671 on a magnetic core piece 1672 arranged on the opposite side of the tape 1612 from the gap 1611. The core piece 1672 and winding 1671 are preferably of a length in the direction transverse to the direction of tape movement to be coupled to all of the head units of the head assembly. This number of head units may be sufficient to record a line of a television signal along a single line across the width of the record tape.

With this system, the tape may first be saturated with a unidirectional field for example by means of a direct current bias source 1674 connected to a solenoid 1675. As the tape passes through the solenoid 1675, the magnetization on the tape may be thought of as moving from point O to point A on the curve of FIGURE 17 so that each successive increment of the tape reaches a state of residual magnetization A′ after leaving the solenoid 1675 neglecting demagnetizing effects. The video signal to be recorded may be supplied to the coil 1671 from a recording signal source 1680 to produce a resultant signal waveform as indicated at 1681 in FIGURE 17. In the absence of sweep and graded winding currents, the energization of the outside coil 1671 produces little or no recording on the record tape 1612. As each channel of the head is activated by the action of windings 1624, 1625 and 1627, 1628, a region of the tape at the gap of the activated head unit receives a pulse of magnetization. If the curve 1682 is considered a plot of magnetic induction B as a function of applied magnetizing force H for the region of tape being acted upon, the pulse of magnetization at the active gap which is in the negative direction corresponds to a shift in the magnetizing force applied to the region of tape at the gap from a point C″ on the video signal waveform 1681 to a negative value C′ and this change in applied magnetizing force brings the tape magnetization to a condition corresponding to point C on curve 1682 and leaves a residual magnetization corresponding to point D as the region of tape represented leaves the active gap. A "whiter" point E″ on waveform 1681 is shifted by a pulse from the activated head unit to a point such as indicated at E′ to shift the tape magnetization for the region of tape at the active gap along the curve from near point A′ to point E corresponding to a residual magnetization on the tape as indicated at point F. A "blacker" point G on the waveform 1681 produces no change from the residual magnetization of the tape indicated by point A′ on the curve 1682 of FIGURE 17. Such a blacker than black pulse corresponds to a sync pulse in the video signal.

For uniform time intervals between switching of successive head units, with sinusoidal currents and linearly graded windings, the current components to the graded winding and sweep winding are between 90° and 180° out of phase, preferably about 120° to 170° apart. The maximum ribbon ampere turns such as indicated by vector 770a in FIGURE 4 may equal or exceed the sweep ampere turns represented by vector 701. They may be equal if the phase angle is 120° as indicated in FIGURE 4; or 1.6 to 1 when the phase angle is about 165° as indicated in FIGURE 14.

As indicated in FIGURE 12 at 1701, 1702 and 1703, auxiliary heads may be employed in the present invention, for example during playback to reproduce synchronizing signals recorded on the record medium audio signals, or to control the speed of movement of the tape during playback for accurate scanning of successive lines on the tape. Such heads may be utilized in FIGURE 7 between successive groups 150–152 or to either side thereof but preferably in line with the common gap 154. The gaps of heads 1701–1703 in FIGURE 12 are shown in alignment with gaps 931–934 of groups 901–904. The same heads may, of course, record synchronizing signals during recording which signals are suitable for controlling a servo mechanism during playback regulating the tape drive speed such that the desired number of video lines per second (15750 American Standard) pass the scanning gap in proper phase relation.

In each of the embodiments, it will be understood that the number of turns illustrated is purely diagrammatic, and that in practice a much larger number of turns may be employed. For example, in FIGURE 3, sweep winding 60 might have 24 turns so as to provide the same total number of turns as the number of turns of the graded winding linking leg 125. The output windings should have the maximum number of turns consistent with stability and self-resonance.

FIGURES 18 and 19 illustrate means for selectively converting a playback head configuration such as shown in FIGURE 16 for optimum recording operation. In FIGURES 18 and 19, the same reference numerals have been applied as at the left playback side in FIGURE 16 to signify that the conversion may be with respect to the playback section of FIGURE 16 by way of example. In FIGURE 18, a straight magnetic shunt piece 1705 of laminated construction is shown as being optionally inserted internally of the head between pole part 10e and base part 20e of the core lamination 1650 of FIGURE 16. Referring to FIGURE 16, it will be understood that the internal shunt piece 1705 provides a low reluctance path for magnetic flux from signal windings 1630 and 1631 at the instants of time when legs 1621 and 1622 are switched from a saturated condition of one polarity to a saturated condition of the opposite polarity.

External magnetic shunt piece 1706 of FIGURE 19 has the same function as piece 1705 in FIGURE 18, but the external shunt piece 1706 may be coupled to a record mode selecting control for the system of FIGURE 16 so as to be automatically moved from a position remote from core section 1650 to the operative position shown in FIGURE 19. Of course, shifting the controls to playback mode would automatically shift the shunt piece 1706 to a position where it would have no substantial effect on the operation of the head in the playback mode.

The head of FIGURE 16 will operate without the shunt piece 1705 or 1706 since leakage flux paths together with the paths through portions 33e and 35e will provide a return path for the recording flux even though such paths are not as low in reluctance.

As another alternative, signal windings 62e, 63e may be energized with the recording signal simultaneously with windings 1630 and 1631. All of these windings would be energized in aiding relationship with respect to the recording gap 1611, and would have a polarity which is opposite to that of the recording bias from source 1670 as represented by lines such as C″C′ in FIGURE 17. This energization of windings 62e, 63e would serve to provide an optimum level of recording flux at gap 1611 when the head unit was activated and thus serves the same purpose as the shunt pieces 1705 and 1706 in FIGURES 18 and 19.

While synchronizing systems for controlling tape speed during playback may be readily supplied by those skilled in the art, an exemplary system has been indicated in FIGURE 16. During recording, a synch generator component 1710 is connected to a single channel record playback head 1711 through switch 1712 in its down position to record a synchronizing waveform on an available channel of the record medium 1612. Gap 1713 of the synch head 1711 may be in transverse alignment with the gap 1611 as indicated with respect to heads 1701–1703 in FIGURE 12. The tape drive mechanism indicated by component 1715 may drive members 1614 and 1615 at constant speed. The synch generator 1710 also supplies suitable signals to the recording graded winding and sweep winding energizing circuits 1641 and 1642. For example a basic 7,875 cycle per second sine wave signal may be supplied to components 1641 and 1642 from generator 1710. The energizing circuits 1641 and 1642 would then adjust the phases of the respective input sine wave signals to correspond to the phase relationships of FIGURE 4, for example, with the output sweep current waveform leading the graded winding current waveform by 120°. The signal recorded on the tape by head 1711 may be a 7,875 cycle per second pulse waveform, for example, consisting of a series of unidirectional pulses. Switches 1717 and 1718 are closed during recording mode along with switches 1663, 1664 and 1665. During playback mode switches 1663, 1664, 1665, 1717 and 1718 are opened, switches 1660, 1661 and 1662 are closed and switch 1712 assumes the left hand position shown in FIGURE 6.

During playback the output from head 1711 is supplied to synch amplifier and shaper component 1725. This component supplies the basic 7,875 cycles sine wave to energizing circuits 70e and 80e for controlling sequential activation of the head units. The current waveform from sweep circuit 70e may lead the current waveform from graded winding circuit 80e by 120° in conformity with FIGURE 4, for example. The output from the synch amplifier and shaper component 1725 may also be delivered to a comparer circuit 1726 which receives a reference signal from synch generator 1710. Any deviation between the reproduced synch signal from the tape and the synch signal from component 1710 is sensed by comparer 1726 and a corresponding error signal is transmitted to the tape drive control circuit 1730 which changes the tape speed in a direction tending to reduce the error signal to zero.

It will be understood that the various dimensions and features described with reference to any of the figures may be applied to each of the other figures. FIGURE 16, for example, should be considered as disclosing constricted cross section portions 33e and 35e having a length of 0.015 inch to 0.060 inch and a cross sectional area of $0.6\times10^{-6}$ to $2.5\times10^{-6}$ square inches. The laminations 25e–30e may be of "Supermalloy" or a similar high permeability alloy. Such material may be maintained in a saturated condition by the combined action of the sweep and graded winding magnetomotive forces except at brief intervals of switching from one polarity of saturation to an opposite polarity in each cycle. The lamination dimension may be as described in connection with FIGURE 1. FIGURE 16 may also be taken as disclosing a playback head with a section which is a mirror image of section 1650 substituted for recording section 1651 and all four legs having constricted cross section portions such as 33e and 35e. Further FIGURE 16 may be taken as disclosing a recording head with a section which is a mirror image of section 1651 substituted for section 1650 or with shunt piece 1705 or 1706 in place.

The successive head units disclosed in connection with FIGURE 16 should be taken as encased in electrically conductive shielding parts such as 40 and 41 in FIGURE 1. The laminations such as 25e–30e of FIGURE 16 may have an overall thickness of .004 inch with a center to center separation between head units of .008 inch. The ribbon windings may have a width of .25 inch and may link the successive head units with numbers of turns as represented in FIGURES 3 and 4. The head units may be in three or four groups of seventy head units each activated in sequence in accordance with the vector diagrams of FIGURES 4 or 13.

A copper gap spacer having a thickness of .00025 inch may define each of the gaps such as 1611 in FIGURE 16.

Any of the balance adjustment means disclosed in connection with FIGURE 15 should be considered as disclosed in connection with the embodiment of FIGURE 16.

With respect to FIGURES 5 and 6, it will be understood that the polarities of the pulses 501–507, 501′–507′; 601–607 and 601′–607′ will be opposite that shown in FIGURES 5A, 5B, 6A and 6B during switching of the corresponding cores from negative to positive saturation. An output as indicated in FIGURE 5C will still be obtained for the case of zero signal flux in the respective cores, but the output for a signal flux of given polarity will have a waveform which is inverted as compared to the waveform shown in FIGURE 6C when the cores are being switched from negative to positive saturation.

The core control system as disclosed herein is applicable to the selective recording on or playback from a desired channel of a record medium, for example. In this case a pulse of amplitude corresponding to the graded bias amplitude of the selected core could be supplied to the common sweep winding for the cores while the graded winding received a constant level direct current which would saturate all of the cores in the absence of a sweep winding current. The pulse in the sweep winding would saturate certain of the cores in an opposite direction, desaturate the selected core and leave other cores of the series with a net saturating magnetomotive force of polarity corresponding to the polarity of magnetomotive force produced by the graded winding.

With respect to the embodiment of FIGURE 15, it will be understood that balance between the excitation windings of the two legs of each core may be secured by adjusting the positions of small individually movable pieces of magnetic material which are movably mounted adjacent the sensitive leg portions of the respective cores.

It is desirable to decrease the .008 inch center-to-center spacing between head units as described in connection with FIGURE 2A, for example, so that the center-to-center spacing is less than twice the width of the heads. This may be accomplished by a thinner graded winding or thinner copper shields between the heads. The graded winding 56, FIGURE 2A, may occupy the entire space between shield parts such as **40*d*. Thus shield part 41*c* would be entirely cut away at the region of ribbon winding 56**.

With reference to FIGURE 16, the recording source 1640 may supply a direct current to windings 1630 and 1631 of sufficient amplitude to produce pulses of magnetomotive force during switching such as indicated at C″–C′ in FIGURE 17. Alternatively, source 1640 can supply signal current and direct current bias to windings 1630 and 1631, and sources 1670 and 1680 can be omitted. Further, signal magnetomotive force pulses can be produced by supplying the video signal to source 1640 while only direct current recording bias is supplied to winding 1671. Recording signal source 1680 would then be disconnected from winding 1671. As a further alternative signal and bias can be supplied both to windings 1630 and 1631 and to winding 1671.

With respect to FIGURES 18 and 19, it will be understood that a single unitary shunt piece such as 1705 or 1706 may extend for the entire width of a group of head units such as 150, or may cooperate with the head units of a plurality of groups such as 150 and 152 in FIGURE 7, or groups 901–904 in FIGURE 12. The entire single piece would then be removed from the head assembly in a lateral direction as indicated by arrow 1710 in FIGURE 18 or in a longitudinal direction to a dotted position as indicated at 1706′ in FIGURE 19.

In FIGURE 16, the synch generator 1710 may deliver 7,875 pulses per second and be synchronized by means of an external 15,750 synch source. The circuits 1641 and 1642 may include means for converting the pulse waveform from synch generator 1710 to suitably phased sine waves. The synch amplifier and shaper 1725 and comparer 1726 may convert pulse input signals to sine waves such that any difference in phase therebetween represents the magnitude and polarity of an error in tape movement which is detected by the comparer 1726 and utilized as a control for the tape drive control circuit 1730. The energizing circuits **70*e* and 80*e* may be such as to convert an input sine wave from shaper circuit 1725** to a sine wave current of proper amplitude and phase for the playback operation.

While numerous important features of the invention will be apparent from the foregoing description, certain of the more important features and advantages of the present invention may be summarized as follows.

(1) The exciting windings controlling switching of the successive cores are located directly on the saturable portions of the cores in close proximity to one another so that the magnetomotive forces produced by the respective exciting windings of each core unit are effectively cancelled and any net magnetic fields are confined to regions relatively remote from the scanning gap or other sensitive portion of the core unit. If the magnetomotive forces are applied by means of sources located at substantially spaced positions, substantial leakage fields cannot be avoided. Furthermore, with remote sources of magnetomotive force cancellation of the magnetic fields at the saturable portion of the core depends on the flux carrying characteristics of the magnetic materials coupling the magnetomotive force sources to the saturable portion of the core. Such materials are subject to many variables such as hysteresis, temperature, aging, magnetic shock, mechanical shock and batch variations in magnetic characteristics which make it impractical to accurately maintain the core units in a balanced condition. By utilizing adjacent sources of magnetomotive force on the saturable portions of the cores, cancellation is a linear function of the magnetomotive forces applied and is not dependent on non-linear and variable magnetic characteristics. The core switching is independent of the magnetic characteristics of the saturable part of the core and is dependent only on the fact that the applied magnetomotive forces are balanced.

(2) A further important concept of the present invention relates to the shielding of the saturating parts of the successive magnetic cores from each other so as to greatly reduce any coupling between the successive core units.

(3) The present invention also provides shielding between the sources of magnetomotive force of the successive core units and the magnetic record medium path. This same shielding serves to reduce the coupling between the pole portions of the successive head units.

(4) By utilizing core sections such as indicated at 22 in FIGURE 1, for example, of simpler configuration and which are not saturated, the phase and balance problems for the system are greatly reduced. For example, the switching of two legs of a core unit can be adjusted to occur at the same instant, but the problem becomes more difficult when four legs are used.

(5) The system of the present invention includes the concept of utilizing exciting windings having a greater length than the length of the constricted cross section portions of the core so as to provide a relatively large magnetomotive force to the constricted portion, while the small volume of the constricted cross section portion results in less energy being stored therein and reduces the criticality of the balance adjustment. The volume of the constricted cross section portions may have a sufficient flux carrying capacity so as not to be saturated by the maximum signal flux to be received from the record medium, although this is not essential. Where it is true the constricted cross section portions do not limit the output capabilities of the head units.

(6) A highly important advantage of the present invention resides in the concept of utilizing sine wave excitation currents. This greatly reduces the problem of transients in the core units.

(7) By a combination of winding size and phasing of exciting currents, the linearity, uniform timing, and active sweep time of a set of cores with a graded winding plus a common sweep has been increased.

While numerous modifications of the embodiments specifically shown in the drawings have been described, it will be understood that many other modifications and variations will be apparent to those skilled in the art from the foregoing specification without departing from the scope of the novel concepts of the present invention.

I claim as my invention:

1. A transducer device comprising a core having large cross section portions with a large flux carrying capacity and having a constricted cross section portion with a substantially reduced cross section and a substantially reduced flux carrying capacity in comparison to said large cross section portions of said core, first and second energizing means coupled to said core for generating cyclically varying magnetomotive forces in the core of respective amplitudes and phases which coact to switch said core from one polarity of magnetization to another polarity of magnetization in successive cycles thereof, and means comprising said core for carrying out a transducing operation at the time intervals when said core is being switched from said one polarity of magnetization to the other polarity of magnetization, said first and second energizing means comprising sources of magnetomotive force producing respective first and second periodic cyclically varying magnetomotive forces acting substantially directly on said constricted cross section portion of said core.

2. A magnetic playback head for coupling to a magnetic record medium comprising a core having means for coupling to said magnetic record medium, said core having large cross section portions providing a high flux carrying capacity and having a constricted cross section portion with a low flux carrying capacity relative to said large cross section portions for receiving signal flux from a portion of the record medium coupled to said core, first and second energizing means directly linking said constricted cross section portion of said core for generating magnetomotive forces of respective amplitudes and phases which coact to switch said constricted cross section portion from one polarity of magnetization to another polarity of magnetization in successive cycles thereof, and output means coupled to said core for producing an electrical output signal in accordance with the signal flux coupled to said core from said magnetic record medium.

3. A transducer device comprising a core having large cross section portions with a large flux carrying capacity and having a constricted cross section portion with a substantially reduced cross section and a substantially reduced flux carrying capacity relative to said large cross section portions of said core, first and second energizing means coupled to said core for generating cyclically varying magnetomotive forces in the core of respective amplitudes and phases which coact to switch said core from one polarity of magnetization to another polarity of magnetization in successive cycles thereof, and means comprising said core for carrying out a transducing operation at the time intervals when said core is being switched from said one polarity of magnetization to the other polarity of magnetization, said core being of laminated construction and having a plurality of laminations providing said relatively large cross section portions of relatively high flux carrying capacity and having a substantially reduced number of laminations providing said constricted cross section portion thereof, and said first and second energizing means comprising winding means directly linking said constricted cross section portion of said core.

4. A transducer device comprising a series of cores each having a leg of magnetic material arranged in transverse alignment with the legs of the other cores, a graded winding linking the legs of the cores of said series of cores with successively different numbers of turns, electrically conductive shielding means comprising legs of electrically conductive material interposed between the legs of the successive cores of said series, means for supplying a first energizing current to said graded winding for producing magnetomotive forces of successive different amplitudes in said legs of the respective cores of said series, means for applying second magnetomotive forces to the legs of the respective cores for switching said cores from one polarity of magnetization to a second polarity of magnetization, and means controlled by the magnetomotive force variation in said legs of said cores for carrying out a transducing operation.

5. A magnetic transducer head for coupling to a magnetic record medium comprising a series of magnetic cores each having means for coupling to a channel of the record medium and having leg means of magnetic material for controlling effective coupling between the core and said record medium, energizing means coupled to the leg means of said series of cores for producing magnetomotive forces in said leg means which sequentially switch said leg means of the series of cores from one polarity of magnetization to another polarity of magnetization to sequentially effect coupling between the series of cores and said record medium, and electrically conductive shielding means substantially encasing the leg means of the successive cores of said series.

6. A multi-channel magnetic head for coupling to a magnetic record medium comprising a series of head units comprising respective first and second core sections having adjacent polar portions defining gaps for coupling to respective channels of the magnetic record medium, and winding means coupled to said first core sections of said series of head units for sequentially switching said head units to an active condition for carrying out a transducing operation, and said second core sections of said series of head units being separate from and of a simpler configuration than said first core sections and being free of windings.

7. A magnetic playback head comprising a series of head units comprising respective individual and separate first and second core sections having means for coupling to respective channels of a record medium, and means coupled to said head units for producing respective opposing magnetomotive forces in said head units which for a major portion of a cycle are unbalanced to saturate portions of the head units and block effective reproduction of signal flux from the record medium coupled to said head units and which magnetomotive forces reach a balanced condition in successive ones of said head units in said cycle to sequentially switch said series of head units to an active transducing condition for reproducing the signal from the record medium, said first core sections having respective readily saturable portions which are substantially more readily saturable than the portions of said second core sections forming part of the signal flux paths in the head units and which are saturated except when the opposing magnetomotive forces are substantially balanced.

8. A magnetic playback head comprising a series of head units comprising respective individual and separate first and second core sections having means for coupling to respective channels of a record medium, and means coupled to said head units for producing respective opposing magnetomotive forces in said head units which for a major portion of a cycle are unbalanced to saturate portions of the head units and block effective reproduction of signal flux from the record medium coupled to said head units and which magnetomotive forces reach a balanced condition in successive ones of said head units in said cycle to sequentially switch said series of head units to an active transducing condition for reproducing the signal from the record medium, said first core sections each having a pair of legs with exciting windings thereon for applying the respective opposing magnetomotive forces to each of the legs of each first core section and for switching of the legs of each core section to an unsaturated condition substantially simultaneously in said cycle, and said second core sections of said head units being of substantially simpler construction than said first core sections and being free of windings.

9. A transducer device comprising a plurality of groups of magnetic core units, each group having winding means including a common conductor linking the successive core units thereof, and each group having energizing means connected to said winding means for sequentially switching said core units from one direction of magnetization to another direction of magnetization in each of a succession of cycles, the core units of the respective groups being switched during respective different portions of each cycle.

10. A transducer device comprising a series of magnetic cores, and means coupled to said cores for sequentially switching the cores from one condition of magnetization to another comprising first means for applying first alternating magnetomotive forces of substantially the same amplitude and phase to the respective cores and second means for applying second alternating magnetomotive forces to the respective cores of substantially the same phase but of successively different amplitudes, and means coupled to said cores for carrying out a transducing operation controlled by the sequential switching of said cores.

11. A video playback head comprising a series of head units having scanning means for coupling to a magnetic record medium and having respective constricted cross section portions in the path for signal flux from the record medium, first and second excitation means coupled to the constricted cross section portions of the successive head units for producing time varying excitation magnetomotive forces therein having sinusoidally varying components of frequency related to the scanning rate to be utilized in reproducing the recorded signal on the record medium and having respective phases and amplitudes to sequentially activate said head units for scanning of the recorded signal, and output winding means directly linking the constricted cross section portions of the successive head units and being substantially balanced with respect to said excitation magnetomotive forces exerted on said head units to produce substantial cancellation of the signals produced in the output winding means during switching thereof in the absence of a signal flux from the record medium.

12. A video recording head comprising a series of head units having scanning means for coupling to a magnetic record medium and having respective core portions in parallel with respect to a path for signal flux from the record medium in the respective head units, first and second excitation means coupled to the respective pairs of core portions of the respective head units for producing sinusoidally varying components of excitation magnetomotive forces therein of frequency related to the scanning rate of an input signal to be recorded on the record medium and having respective phases and amplitudes to sequentially activate said head units, and input signal means coupled to said head units for supplying an input signal to be recorded and operable to produce a recorded signal on the portions of the record medium at the scanning means of the sequentially activated head units.

13. A multiple unit transducer device comprising a series of core units for sequential activation to perform a transducing operation, means for exerting a first magnetomotive force on each of the core units having a first sinusoidal component of substantially the same magnitude for each core unit and of a first phase and for exerting a second magnetomotive force on each of the core units having a second sinusoidal component of a second phase differing from said first phase by a phase angle substantially exceeding 90° but less than 180° and of successively different amplitudes in the respective core units, and electric signal coupling means coupled to said core units for transducing a signal between an electric form in said coupling means and a magnetic form in said core units.

14. A multiple unit transducer device comprising a number N of groups of core units, each group of core units having means for exerting first and second magnetomotive forces having phase angles and relative magnitudes in the respective core units to switch the core units from one condition of magnetization to another condition of magnetization sequentially over an interval of substantially $\pi/N$ radians in a half cycle, and the phases of the magnetomotive forces of the groups being successively offset by angles of substantially $\pi/N$ radians so that core units in the successive groups are switched in successive intervals of the half cycle.

15. A transducer device comprising a series of core units having a common sweep winding coupled to all of said core units in common and having a graded winding with successively greater numbers of turns coupled to the respective core units, and means for supplying sinusoidal currents to said sweep winding and said graded winding having the same frequency but having a phase difference between approximately 120° and 165° to provide net magnetomotive forces acting on the successive core units which have generally equal amplitudes and which differ in phase by substantially equal amounts.

16. A transducer device comprising
a plurality of groups of core units,
each group having a common sweep winding coupled to the successive core units of the group in common, and
each group having a graded winding with successively greater numbers of turns coupled to the respective core units of the group,
means for supplying sinusoidal currents to the sweep winding and graded winding of each group having substantially the same magnitude and frequency but having a phase difference between approximately 120° and 165°,
said supplying means supplying currents to the sweep and graded windings of the respective groups which are successively offset in phase by an angle greater than the phase difference between the net magnetomotive forces of the first and last core units of the preceding group so that the core units of a first group are switched in sequence after which the core units of successive groups are switched in sequence, and
means controlled by the switching of the successive core units of the successive groups for carrying out a transducing operation.

17. A magnetic recording head assembly comprising
a series of head units having non-magnetic gaps for coupling to respective channels of a magnetic record medium,
means extending in overlying relation to said non-magnetic gaps for producing a first magnetic recording field in the region of said gaps below the value where the field will be effectively recorded on said record medium,
recording means coupled to said head units for supplying a second magnetic recording field at said gaps of strength to effect a recording on the record medium in conjunction with said first magnetic recording field,
means comprising a saturable portion of each head unit for effectively maintaining said second magnetic recording field below said strength required to effect a recording on the medium,
and means for desaturating said saturable portion of each of said head units to effect a recording on the record medium at the corresponding non-magnetic gap.

18. A magnetic transducer head for a magnetic record medium comprising
a series of head units having respective magnetic cores with non-magnetic gaps for coupling with the record medium,
signal translating means in coupling relation with said gaps for signal flux interlinkage therewith to translate between a signal current therein and a signal magnetization of the portion of the record medium at said gap,
means comprising saturable portions of said cores for blocking signal flux interlinkage between said signal translating means and the respective non-magnetic gaps,
means for producing first and second magnetomotive forces in each of said cores of alternating polarity with at least the first of the magnetomotive forces having respective different amplitudes in the saturable portions of the respective cores,
said magnetomotive forces being of respective amplitudes and waveforms in the respective saturable portions of said cores to sequentially desaturate said saturable portions to scan said record medium.

19. A magnetic transducer head comprising
a magnetic core having coupling means for coupling the core to a channel of a record medium of about .004 inch or less and having a signal flux path therein for flux interlinkage with the channel of the record medium,
said core having a constricted portion providing part of said signal flux path of a length of approximately .060 inch or less and a total cross sectional area of $5 \times 10^{-6}$ square inches or less, and
means for switching said constricted portion of said signal flux path from a saturated condition to an unsaturated condition and back to a saturated condition at a rate of the order of 4.5 megacycles per second to enable the core to transduce elemental parts of successive lines of a video frequency signal.

20. A magnetic transducer device comprising
a series of magnetic cores having coupling means for coupling the cores to respective channels of a record medium with each channel having a width of about .004 inch or less and the cores having respective signal flux paths therein for flux interlinkage with the respective channels of the record medium,
said cores each having a constricted portion providing part of said signal flux path of a length of approximately .060 inch or less and a total cross sectional area of $5 \times 10^{-6}$ square inches or less, and
means for switching the constricted portions of the signal flux paths of the successive cores in sequence from a saturated condition to an unsaturated condition and back to a saturated condition at a rate of the order of 4.5 megacycles per second to enable the cores to transduce elemental parts of a line of a video frequency signal, and
said switching means comprising graded winding means of ribbon configuration linking the constricted portions of the successive cores with successively different numbers of turns and having a width dimension substantially greater than the length dimension of said constricted portions of said cores.

21. A magnetic playback head for video signals comprising
a series of cores having scanning means for coupling to respective channels of a record medium with the channels having a width of about .004 inch or less and having respective signal flux paths therein for receiving signal flux from the respective channels of the record medium,
said cores being of plural part construction with respective first parts thereof each having a pair of constricted portions providing parts of the respective signal flux paths of length approximately .060 inch or less and a total cross section of $5 \times 10^{-6}$ square inches or less and with respective second parts thereof being provided by a unitary member extending for the width dimension of the playback head,
means for switching said constricted portions of the respective signal flux paths from a saturated condition to an unsaturated condition and back to a saturated condition at a rate of the order of 4.5 megacycles per second to reproduce a video signal recorded on the record medium,
said switching means comprising graded winding means of ribbon configuration linking the constricted portions of the successive cores with successively different numbers of turns and having a width dimension substantially greater than the length dimension of said constricted portions and excitation winding means linking the constricted portions of the successive cores with substantially the same number of turns,
means for supplying sinusoidal currents which are a function of the line frequency of the recorded signal on the record medium and which are of substantially the same amplitude but of different phase to the graded winding means and excitation winding means of the cores, and
output means coupled to the cores for producing an an electric video signal in accordance with the video signal recorded on the record medium.

22. A magnetic playback head comprising a magnetic core having a gap of predetermined reluctance for coupling of the core to a magnetic record medium and having a signal flux path for receiving signal flux from the record medium, said core having a constricted portion providing part of said signal flux path and of reluctance of the same order of magnitude as the gap reluctance.

23. A magnetic flux sensitive head comprising a magnetic core having a constricted cross section sensitive portion, and a coil encircling said constricted cross section sensitive portion, said coil having an axial extent many times as great as the length dimension of said constricted cross section sensitive portion of said core.

24. A magnetic record for use in magnetic playback apparatus comprising a magnetic record medium movable in a given direction and having a plurality of groups of channels, said groups of channels being spaced transversely of the direction of movement of the record medium and having a first recorded signal distributed over the successive channels of the successive groups, and said record medium having further auxiliary channels between the groups of channels and having second signals different from said first signal recorded thereon.

25. A combination recording and playback head comprising a magnetic core having scanning means for coupling to a magnetic record medium, said core having a recording core section and a playback core section for magnetic flux interlinkage with a record medium at said scanning means, means for selectively activating said recording core section to carry out a recording operation, and means for selectively activating said playback core section for carrying out a playback operation, said playback core section having a portion of reduced magnetic flux carrying capacity in comparison to said recording core section, and said recording core section activating means comprising means for reducing the effect of the reluctance of said portion of reduced flux carrying capacity of said playback core section during recording operation.

26. A magnetic transducer head assembly for coupling to a moving magnetic record medium comprising groups of head units disposed in spaced relation transversely to the direction of movement of the record medium, means for sequentially activating successive head units of the groups in sequence for scanning of a series of channels on the record medium to transduce a first signal, and further head means disposed between successive groups of head units for scanning of auxiliary channels on the record medium for transducing second signals different from said first signal transduced by said groups of head units.

References Cited

UNITED STATES PATENTS

| | | | |
|---|---|---|---|
| 3,171,107 | 2/1965 | Rogers | 179—200.2 |
| 2,872,530 | 2/1959 | Jolly | 179—100.2 |
| 2,897,290 | 7/1959 | Lyon | 179—100.2 |
| 2,915,597 | 12/1959 | Wanlass | 179—100.2 |
| 2,921,143 | 1/1960 | Selsted | 179—100.2 |
| 2,955,169 | 10/1960 | Stedtnitz | 179—100.2 |

FOREIGN PATENTS

| | | |
|---|---|---|
| 1,026,974 | 2/1955 | Germany. |

TERRELL W. FEARS, *Primary Examiner.*

IRVING L. SRAGOW, JAMES W. MOFFITT, *Examiners.*